US012672067B2

(12) United States Patent
Lin et al.

(10) Patent No.: US 12,672,067 B2
(45) Date of Patent: Jun. 30, 2026

(54) WIRELESS COMMUNICATION SYSTEM, WIRELESS ACCESS POINT, AND ELECTRONIC DEVICE

(71) Applicant: REALTEK SEMICONDUCTOR CORPORATION, Hsinchu (TW)

(72) Inventors: Cheng-Feng Lin, Hsinchu (TW); Chiao-Ling Yang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 472 days.

(21) Appl. No.: 17/959,342

(22) Filed: Oct. 4, 2022

(65) Prior Publication Data

US 2023/0109180 A1 Apr. 6, 2023

(30) Foreign Application Priority Data

Oct. 5, 2021 (TW) .................................. 110137055

(51) Int. Cl.
*H04W 48/02* (2009.01)
*H04W 52/02* (2009.01)

(52) U.S. Cl.
CPC ... *H04W 52/0235* (2013.01); *H04W 52/0212* (2013.01)

(58) Field of Classification Search
CPC ......... H04W 52/0235; H04W 52/0212; H04W 52/0216; H04W 48/02; H04W 84/12; Y02D 30/70
USPC ......................................................... 370/311
See application file for complete search history.

(56) References Cited

U.S. PATENT DOCUMENTS

| | | | | | |
|---|---|---|---|---|---|
| 8,170,002 | B2 * | 5/2012 | Wentink | ............ | H04W 52/0216 |
| | | | | | 370/351 |
| 10,091,726 | B2 * | 10/2018 | Park | ................. | H04W 52/0235 |
| 10,412,677 | B2 * | 9/2019 | Choi | ................. | H04W 52/0238 |
| 11,510,269 | B2 * | 11/2022 | Asterjadhi | ........ | H04W 52/0219 |
| 2014/0169290 | A1 | 6/2014 | Seok | | |

(Continued)

FOREIGN PATENT DOCUMENTS

| | | | | | |
|---|---|---|---|---|---|
| GB | 2415573 | A | 12/2005 | | |
| TW | I523548 | B | 2/2016 | | |
| WO | WO-2020028351 | A1 * | 2/2020 | ........... | H04L 5/0048 |

OTHER PUBLICATIONS

Šljivo, A.; Kerkhove, D.; Tian, L.; Famaey, J.; Munteanu, A.; Moerman, I.; Hoebeke, J.; De Poorter, E. "Performance Evaluation of IEEE 802.11ah Networks With High-Throughput Bidirectional Traffic". Sensors 2018, 18, 325. https://doi.org/10.3390/s18020325 (Year: 2018).*

(Continued)

*Primary Examiner* — Christopher M Crutchfield
*Assistant Examiner* — Syed Ahmed
(74) *Attorney, Agent, or Firm* — WPAT, PC

(57) ABSTRACT

A communication system includes a wireless access point and electronic devices. The wireless access point is configured to transmit a packet having sleep permission map information. The electronic devices are configured to be connected with the wireless access point via a channel and receive the packet and operate in a power saving mode. Each of the electronic devices is configured to be selectively prohibited from exchanging data with the wireless access point via the channel during a predetermined interval according to the sleep permission map information.

19 Claims, 5 Drawing Sheets

(56) References Cited

U.S. PATENT DOCUMENTS

| | | | |
|---|---|---|---|
| 2023/0217521 A1* | 7/2023 | Kim | H04W 76/15 |
| | | | 370/329 |
| 2024/0031777 A1* | 1/2024 | Huang | H04W 4/06 |

OTHER PUBLICATIONS

Tian, L.; Santi, S.; Latré, S.; Famaey, J. Accurate sensor traffic estimation for station grouping in highly dense IEEE 802.11ah networks. In Proceedings of the First ACM International Workshop on the Engg of Reliable, Robust, and Secure Embedded Wireless Sensing Systems Delft, The Netherlands (Year: 2017).*

Tian, L.; Khorov, E.; Latré, S.; Famaey, J. Real-Time Station Grouping under Dynamic Traffic for IEEE 802.11ah. Sensors (Year: 2017).*

OA letter of a counterpart TW application (appl. No. 110137055) mailed on Jul. 27, 2022. Summary of the TW OA letter: 1. Claims 1-3 and 6-10 are rejected as allegedly being anticapted by cited reference 1 (TW I523548B, also published as US20140169290A1). 2. Claims 4-5 are rejected as allegedly being unpatenable over cited reference 1 Correspondence between claims of TW counterpart application and claims of US application: 1. Claims 1-8, 9, and 10 in TW counterpart application correspond to claims 1-8, 11, and 16 in US application, respectively.

Prepared by the 802.11 Working Group of the LAN/MAN Standards Committee of the IEEE Computer Society, IEEE P802.11ax™ Draft standard 4.0, "Draft Standard for Information technology—Telecommunications and information exchange between systems Local and metropolitan area networks—Specific requirements", Feb. 2019 by the IEEE.

Wi-Fi Alliance Technical CommitteeQuality of Service (QoS) Task Group, "WMM™ Specification Wi-Fi Alliance v1.2" , 2012, Wi-Fi Alliance.

M. Nurchis and B. Bellalta, "Target Wake Time: Scheduled Access in IEEE 802.11ax WLANs," in IEEE Wireless Communications, vol. 26, No. 2, pp. 142-150, Apr. 2019, doi: 10.1109/MWC.2019.1800163.

Wi-Fi Alliance, "Wi-Fi Peer-to-Peer (P2P) Technical Specification Version 1.5", 2014, Wi-Fi Alliance.

OA letter of a counterpart CN application (appl. No. 202111205028.5) mailed on Jun. 28, 2025.

* cited by examiner

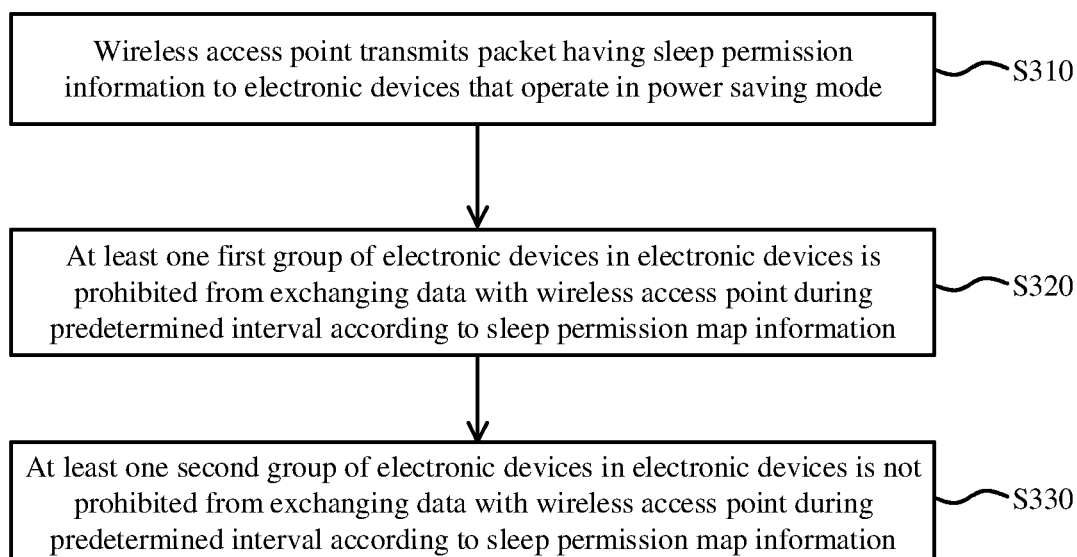

300

Wireless access point transmits packet having sleep permission information to electronic devices that operate in power saving mode — S310

At least one first group of electronic devices in electronic devices is prohibited from exchanging data with wireless access point during predetermined interval according to sleep permission map information — S320

At least one second group of electronic devices in electronic devices is not prohibited from exchanging data with wireless access point during predetermined interval according to sleep permission map information — S330

Fig. 3A

WIRELESS COMMUNICATION SYSTEM, WIRELESS ACCESS POINT, AND ELECTRONIC DEVICE

BACKGROUND OF THE INVENTION

1. Field of the Invention

The present disclosure relates to a wireless communication system, especially to a wireless communication system, a wireless access point, and an electronic device that have a controllable power saving mechanism.

2. Description of Related Art

As more and more electronic devices can use WiFi network, the contention and interference of electronic devices on the channel become more and more serious. If there are too many electronic devices to transmit data on the same channel at the same time, the transmission time of those electronic devices will become longer. As a result, the power consumption of these electronic devices are increased, and the overall transmission performance is reduced.

SUMMARY OF THE INVENTION

In some aspects of the present disclosure, a communication system includes a wireless access point and a plurality of electronic devices. The wireless access point is configured to transmit a packet having sleep permission map information. The plurality of electronic devices are configured to be connected with the wireless access point via a channel and receive the packet and operate in a power saving mode. Each of the plurality of electronic devices is configured to be selectively prohibited from exchanging data with the wireless access point via the channel during a predetermined interval according to the sleep permission map information.

In some aspects of the present disclosure, a wireless access point includes a first transceiver circuit, a second transceiver circuit, and a processor circuit. The first transceiver circuit is configured to be connected with Internet. The second transceiver circuit is configured to be connected with a plurality of electronic devices via a channel, in which the electronic devices operate in a power saving mode. The processor circuit is configured to transmit a packet having sleep permission map information to the plurality of electronic devices via the second transceiver circuit, in order to control the plurality of electronic devices to determine whether to be prohibited from exchanging data with the second transceiver circuit during a predetermined interval according to the sleep permission map information.

In some aspects of the present disclosure, an electronic device includes a transceiver circuit and a processor circuit. The transceiver circuit is configured to be connected with a wireless access point via a channel, in order to receive a packet comprising sleep permission map information. The processor circuit is configured to selectively prohibit the transceiver circuit from exchanging data with the wireless access point during a predetermined interval according to the sleep permission map information, wherein the transceiver circuit operates in the power saving mode during the predetermined interval.

These and other objectives of the present disclosure will no doubt become obvious to those of ordinary skill in the art after reading the following detailed description of the preferred embodiments that are illustrated in the various figures and drawings.

BRIEF DESCRIPTION OF THE DRAWINGS

FIG. 3A shows a flow chart of an uplink frame exchanging method according to some embodiments of the present disclosure.

DETAILED DESCRIPTION OF THE PREFERRED EMBODIMENTS

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other. In this document, the term "circuit" may indicate an object, which is formed with one or more transistors and/or one or more active/passive elements based on a specific arrangement, for processing signals.

As used herein, the term "and/or" includes any and all combinations of one or more of the associated listed items. Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. For ease of understanding, like elements in various figures are designated with the same reference number.

Figures 1, 2A:
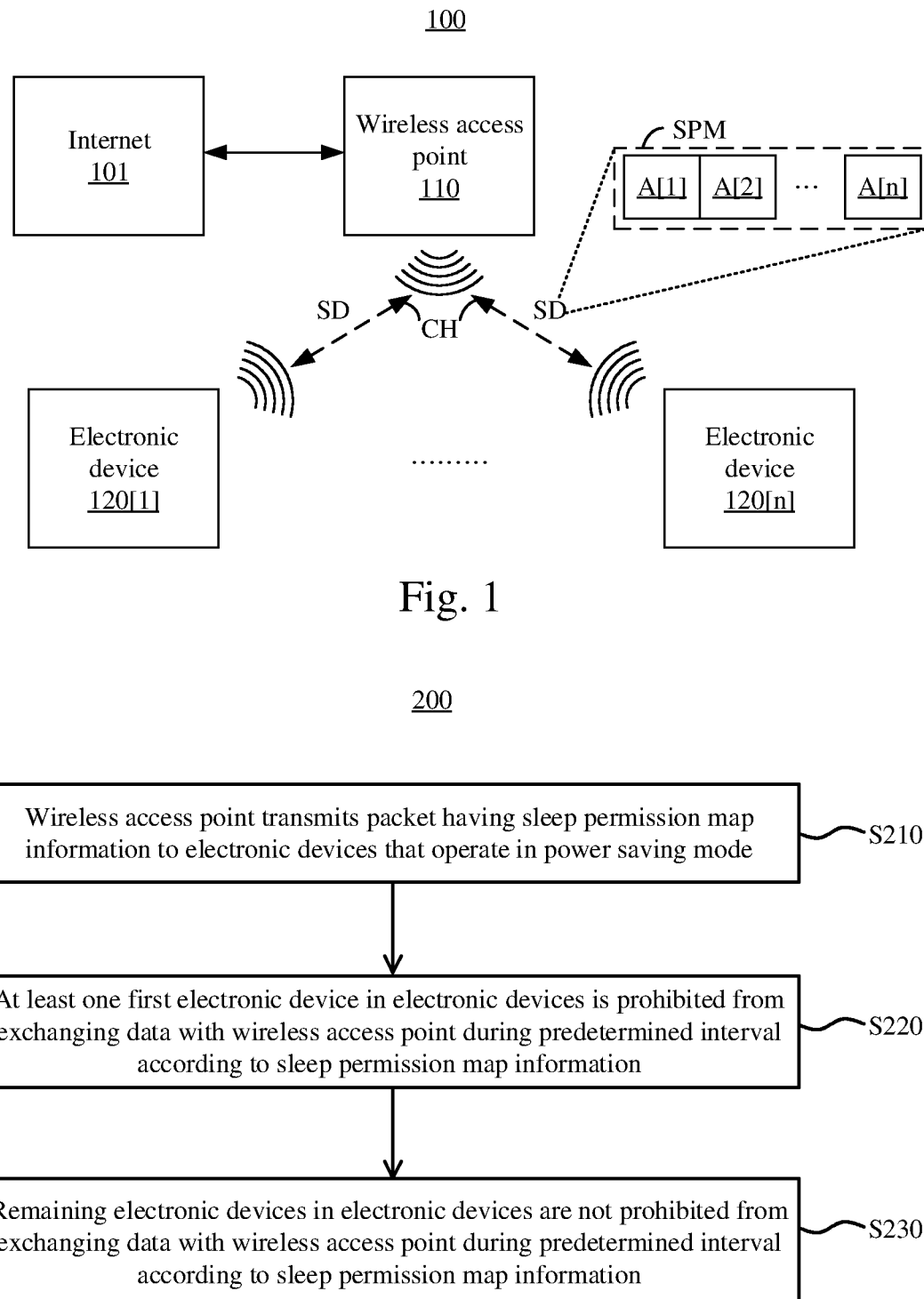
FIG. 1 shows a schematic diagram of a wireless communication system according to some embodiments of the present disclosure.
FIG. 2A shows a flow chart of a downlink frame exchanging method according to some embodiments of the present disclosure.

FIG. 1 shows a schematic diagram of a wireless communication system 100 according to some embodiments of the present disclosure. The wireless communication system 100 includes a wireless access point 110 and electronic devices 120[1]-120[n], in which n may be a positive integer higher than or equal to 1.

The wireless access point 110 is connected with Internet 101. In different embodiments, the electronic devices 120[1]-120[n] may be various electronic devices having wireless communication ability, which may be but is not limited to, smart phone, smart television, tablet computer, laptop, desktop computer, home video game console, and so on. The electronic devices 120[1]-120[n] are connected to the wireless access point 110 via a channel CH, in order to access Internet 101. In some embodiments, the wireless access point 110 may establish the channel CH based on a predetermined communication standard. For example, the predetermined communication standard may be IEEE 802.11 or its relevant standards (e.g., IEEE 802.11ax). In some embodiments, the electronic devices 120[1]-120[n] may operate in a power saving mode defined in the predetermined communication standard and determine whether to be prohibited from exchanging data during a predetermined interval in the power saving mode according to sleep permission map information SPM issued from the wireless access point 110. In some embodiments, the term "exchanging data" indicates behaviors of transmitting and/or receiving data (e.g., receiving data from the wireless access point 110 and/or transmitting data from the electronic devices 120[1]-120[n]).

For example, the wireless access point 110 may transmit a packet SD that carries the sleep permission map information SPM to the electronic devices 120[1]-120[n]. The electronic devices 120[1]-120[n] may determine whether to be prohibited from exchanging data with the wireless access point 110 via the channel CH during a next predetermined interval (e.g., a predetermined interval TM in FIG. 2B or 3B) according to the sleep permission map information SPM. In other words, the wireless access point 110 may set the sleep permission map information SPM to control a corresponding one of the electronic devices 120[1]-120[n] to stop transmitting or receiving data for a period of time. As a result, the wireless access point 110 may reduce contention of the electronic devices 120[1]-120[n] on the channel CH, in order to improve the transmission efficiency and reduce the overall power consumption of the system. In some embodiments, the packet SD may be, but not limited to, a packet that is transmitted to the electronic devices 120[1]-120[n] simultaneously. For example, the packet SD may be a beacon frame and/or a broadcast frame. The types of the packet SD are given for illustrative purposes only, and the present disclosure is not limited thereto. Various packets able to carry information of the sleep permission map information SPM are within the contemplated scope of the present disclosure.

In some embodiments, similar to traffic indication map information defined in the specification of IEEE 802.11, the sleep permission map information SPM may be information having a bit map structure. For example, as shown in FIG. 1, the sleep permission map information SPM includes association identifiers (AIDs) A[1]-A[n], which respectively correspond to the electronic devices 120[1]-120[n]. Each of the electronic devices 120[1]-120[n] may determine whether to communicate data with the wireless access point 110 during the predetermined interval according to a corresponding one of the AIDs A[1]-A[n]. For example, if the AID A[1] has a logic value of 1, the electronic device 120[1] may operate in the power saving mode according to the AID A[1] and is prohibited from exchanging data. Alternatively, if the AID A[1] has a logic value of 0, the electronic device 120[1] may operate in the power saving mode according to the AID A[1] and is not prohibited from exchanging data in subsequent operations. With this analogy, each of the remaining electronic devices 120[2]-120[n] may determine whether to further stop transmitting and receiving data when operating in the power saving mode according to a corresponding one of the AIDs A[2]-A[n]. In some embodiments, the wireless access point 110 may utilize the sleep permission map SPM to selectively prohibit the electronic devices 120[1]-120[n] from exchanging data. That is, according to the decision of the wireless access point 110, the wireless access point 110 may allow all of electronic devices 120[1]-120[n] to exchange data (i.e., none of the electronic devices 120[1]-120[n] are prohibited from exchanging data) or may prohibit one or more devices in the electronic devices 120[1]-120[n] from exchanging data.

FIG. 2A shows a flow chart of a downlink frame exchanging method 200 according to some embodiments of the present disclosure. In examples of FIG. 2A, it is assumed that at least one of the electronic devices 120[1]-120[n] is prohibited from exchanging data. In operation S210, the wireless access point transmits the packet having the sleep permission map information to the electronic devices that operate in the power saving mode. In operation S220, at least one first electronic device in the electronic devices is prohibited from exchanging data with the wireless access point during a predetermined interval according to the sleep permission map information. In operation S230, the remaining electronic devices in the electronic devices are not prohibited from receiving data from the wireless access point during the predetermined interval.

Figure 2B:
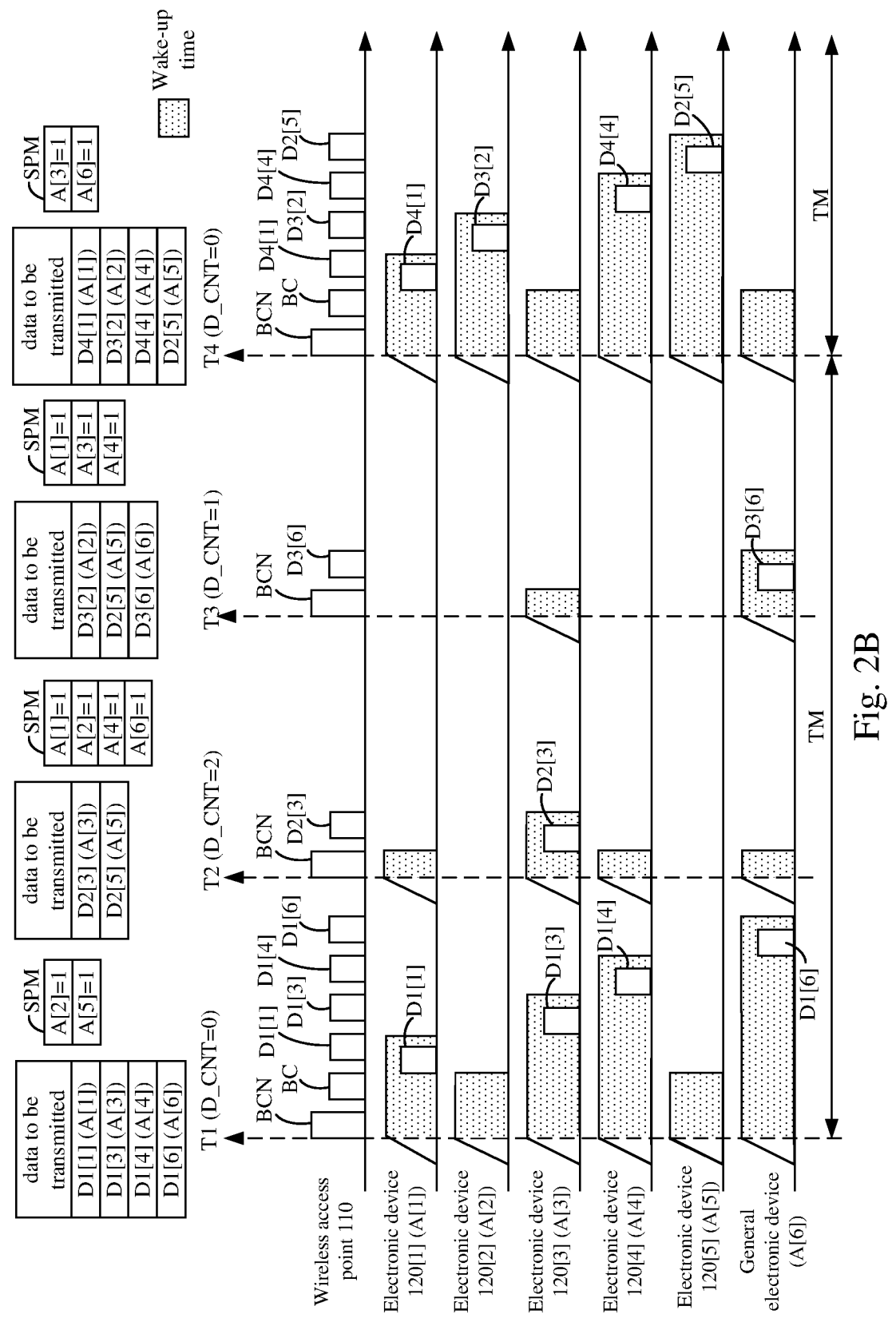
FIG. 2B shows a timing diagram of the wireless communication system in FIG. 1 exchanging the downlink frame according to some embodiments of the present disclosure.

In order to illustrate operations in FIG. 2A, reference is made to FIG. 2B, and FIG. 2B shows a timing diagram of the wireless communication system 100 in FIG. 1 exchanging the downlink frame according to some embodiments of the present disclosure. Similarly, in examples of FIG. 2B, it is assumed that at least one of the electronic devices 120[1]-120[n] is prohibited from exchanging data.

In examples of FIG. 2B, the wireless access point 110 is connected to the electronic devices 120[1]-120[5] (i.e., n=5) and a general electronic device that cannot identify sleep permission map information SPM, in which the electronic devices 120[1]-120[5] respectively correspond to the AIDs A[1]-A[5], and the general electronic device corresponds to the AID A[6].

In some embodiments, the wireless access point 110 may be configured to set the predetermined interval (labeled as TM) according to a delivery traffic indication map (DTIM) count (labeled as D_CNT). For example, the wireless access point 110 may set the DTIM count D_CNT to set intervals for sending the broadcast frame BC. In this example, the DTIM period is 3, which indicates that the wireless access point 110 sends one broadcast frame BC every 3 beacon intervals. In this example, the predetermined interval TM may be set to be the same as the DTIM period, but the present disclosure is not limited thereto. In some embodiments, when the DTIM count D_CNT has a predetermined value (e.g., zero), the electronics electronic devices 120[1]-120[5] are allowed to exchange data.

In this example, the wireless access point 110 sends a beacon frame (labeled as BCN) and the broadcast frame BC to the electronic devices 120[1]-120[5] and the general electronic device when the DTIM count D_CNT has the predetermined value (e.g., 0). In some embodiments, the beacon frame BCN may be the packet SD in FIG. 1, which carries the sleep permission map information SPM and the aforementioned traffic indication map information. Before time T1, all electronic devices 120[1]-120[5] and general electronic device operate in the power saving mode. At time T1, all electronic devices 120[1]-120[5] and general electronic device are awakened, in order to receive the beacon frame BCN and the broadcast frame BC from the wireless access point 110.

During an interval from time T1 to time T2 (hereinafter referred to as first period, which corresponds to the DTIM count having a value of 0), a buffer circuit (e.g., buffer circuit 440 in FIG. 4) in the wireless access point 110 stores data D1[1] to be transmitted to the electronic devices 120[1], data D1[3] to be transmitted to the electronic devices 120[3], data D1[4] to be transmitted to the electronic device 120[4], and data D1[6] to be transmitted to the general electronic device. Under this condition, the wireless access point 110 may set the AIDs A[2] and A[5] in sleep permission map information SPM to be logic values of 1 according to data settings stored in the buffer circuit, in order to control the electronic devices 120[2] and 120[5] (i.e., electronic devices that have no data to receive) to enter the power saving mode and to be prohibited from exchanging data until the predetermined interval TM is expired. In other embodiments, the wireless access point 110 may perform an algorithm based on additional information to set the sleep permission map information SPM, in order to selectively assign at least one specific electronic device to enter the power saving mode and to be prohibited from exchanging data until the predetermined interval TM is expired. In some embodiments, the wireless access point 110 may set the traffic indication map information based on the correspondence between data in the buffer circuit and the electronic device to be transmitted, and the electronic devices 120[1]-120[5] and the general electronic device may determine whether to acquire data from the wireless access point 110 according to the traffic indication map information.

In response to the AIDs A[2] and A[5] in sleep permission map information SPM, the electronic devices 120[2] and 120[5] operate in the power saving mode and stop transmitting and receiving data during the predetermined interval TM. As a result, the electronic devices 120[2] and 120[5] are prohibited from exchanging data with the wireless access point 110 via the channel CH until the predetermined interval TM is expired (e.g., at time T4 when the next DTIM count has the predetermined value (e.g., 0)) (i.e., operation S220).

During the first period, the AIDs A[1], A[3], and A[4] (not shown) that respectively correspond to the electronic devices 120[1], 120[3], and 120[4] in the sleep permission map information SPM are logic values of 0. Under this condition, the electronic devices 120[1], 120[3], and 120[4] operate in the power saving mode but are not prohibited from transmitting and/or receiving data. Accordingly, the electronic devices 120[1], 120[3], and 120[4] may receive data from the wireless access point 110 via the channel CH during the predetermined interval TM according to the specification of power saving mode (i.e., operation S230). In addition, as the general electronic device cannot identify the sleep permission map information SPM, the general electronic device cannot be prohibited from exchanging data. For example, during the first period, the electronic devices 120[1], 120[3], 120[4], and the general electronic device may respectively receive the data D1[1], D1[3], D1[4], and D1[6] from the wireless access point 110 according to the traffic indication map information.

During an interval from time T2 to time T3 (hereinafter referred to as a second period, which corresponds to the DITM count D_CNT having a value of 2), the buffer circuit in the wireless access point 110[store] stores data D2[3] to be transmitted to the electronic device 120[3] and data D2[5] to be transmitted to the electronic device 120[5]. Under this condition, the wireless access point 110 may set the AIDs A[1], A[2], A[4], and A[6] in the sleep permission map information SPM to be the logic values of 1, in order to control the electronic devices 120[1], 120[2], and 120[4] and the general electronic device to enter the power saving mode and to be prohibited from exchanging data.

At time T2, the electronic devices 120[1], 120[3], and 120[4] and the general electronic device are awakened, in order to receive the beacon frame BCN that carries the sleep permission map information SPM from the wireless access point 110. In response to the AIDs A[1] and A[4] in the sleep permission map information SPM, the electronic devices 120[1] and 120[4] are kept operating in the power saving mode and are prohibited from exchanging data with the wireless access point 110 via the channel CH during the predetermined interval TM until time T4 (i.e., operation S220). In other words, during a previous period (i.e., the first period), the electronic devices 120[1] and 120[4] were operating in the power saving mode and were able to exchange data. During the second period, the electronic devices 120[1] and 120[4] are prohibited from exchanging data during the predetermined interval TM according to the sleep permission map information. Similarly, during the previous period (i.e., the first period), the electronic devices 120[2] and 120[5] have stopped exchanging data according to sleep permission map information SPM. Accordingly, the electronic devices 120[2] and 120[5] do not receive the beacon frame BCN from the wireless access point 110, and the electronic device 120[5] does not receive the data D2[5]. Moreover, as the general electronic device cannot identify sleep permission map information SPM, and thus the general electronic device may continue exchanging data and receive the beacon frame BCN during the second period.

During the second period, the electronic device 120[3] is not prohibited from exchanging data according to the sleep permission map information SPM, and thus is able to receive the data D2[3] from the wireless access point 110 via the channel CH according to the traffic indication map information (i.e., operation S230). As the general electronic device cannot identify the sleep permission map information SPM, and thus the general electronic device still continues exchanging data. In this example, during the second period, as the wireless access point 110 has no data to be transmitted to the general electronic device, the general electronic device may enter a sleep state until time T3 according to the specification of the power saving mode.

During an interval from time T3 to time T4 (hereinafter referred to as a third period, which corresponds to the DTIM count D_CNT having the value of 1), the buffer circuit in the wireless access point 110 stores data D3[2] to be transmitted to the electronic device 120[2], D2[5] to be transmitted to the electronic device 120[5], and D3[6] to be transmitted to the general electronic device. Under this condition, the wireless access point 110 may set the AIDs A[1], A[3], and A[4] in the sleep permission map information SPM to be the logic values of 1 according to those data, in order to prohibit the electronic devices 120[1], 120[3], and 120[4] that operate in the power saving mode from exchanging data.

At time T3, the electronic device 120[3] is awakened, in order to receive the beacon frame BCN that carries the sleep permission map information SPM from the wireless access point 110. In response to the AID A[3] in the sleep permission map information SPM, the electronic device 120[3] will be prohibited from exchanging data with the wireless access point 110 during the predetermined interval TM until time T4 (i.e., operation S220). In other words, during the previous one period (i.e., the second period), the electronic device 120[3] operates in the power saving mode but was not prohibited from exchanging data. During the third period, the electronic device 120[3] is prohibited from exchanging data with the wireless access point 110 according to the sleep permission map information SPM. Similarly, during the previous one period (i.e., the second period), the electronic devices 120[1], 120[2], 120[4], and 120[5] have stopped exchanging data with the wireless access point 110. Accordingly, the electronic devices 120[1], 120[2]. 120[4], and 120[5] do not receive the beacon frame BCN, and the electronic device 120[5] does not receive the data D2[5]. Moreover, as the general electronic device cannot identify the sleep permission map information SPM, and thus the general electronic device receives the beacon frame BCN and receives the data D3[6] from the wireless access point 110 according to the traffic indication map information during the third period. After receiving the data D3[6], the general electronic device may enter the sleeping state according to the specification of the power saving mode until time T4. At time T4, as the previous predetermined interval TM is ended, the electronic devices 120[1], 120[2], 120[3], 120[4], and 120[5] are not prohibited from exchanging data with the wireless access point 110. Furthermore, as the DTIM count D_CNT corresponding to time T4 has the predetermined value (e.g., 0), the wireless access point 110 transmits the beacon frame BCN and the broadcast frame BC. Under this condition, all the electronic devices 120[1]-120[5] and the general electronic device are awakened, in order to receive the beacon frame BCN and the broadcast frame BC from the wireless access point 110.

During a DTIM period starting from time T4 (hereinafter referred to as a fourth period), the buffer circuit in the wireless access point 110 stores data D4[1] to be transmitted to the electronic device 120[1], data D4[4] to be transmitted to the electronic device 120[4], data D2[5] to be transmitted to the electronic device 120[5], and data D3[2] to be transmitted to the electronic device 120[2]. Under this condition, the wireless access point 110 may set the AIDs A[3] and A[6] in the sleep permission map information SPM to be the logic values of 1, in order to prohibit the electronic device 120[3] and the general electronic device from exchanging data.

In response to the AID A[3] in the sleep permission map information SPM, the electronic device 120[3] enters the power saving mode and is prohibited from exchanging data during the predetermined interval TM, until the current predetermined interval TM is expired (e.g., the time when the next DTIM count D_CNT has the predetermined value) (i.e., operation S220). As the general electronic device cannot identify the sleep permission map information SPM, the general electronic device is not prohibited from exchanging data.

During the fourth period, as the electronic devices 120[1], 120[2], 120[4], and 120[5] are not prohibited from exchanging data according to the sleep permission map information SPM, the electronic devices 120[1], 120[2], 120[4], and 120[5] may receive data from the wireless access point 110 via the channel CH during the predetermined interval TM (i.e., operation S230). For example, during the fourth period, the electronic devices 120[1], 120[2], 120[4], and 120[5] may respectively and sequentially receive data D4[1], D3[2], D4[4], and D2[5] from the wireless access point 110 according to the traffic indication map information. Furthermore, during the fourth period, as the wireless access point 110 has no data to be transmitted to the general electronic device, the general electronic device may enter the sleeping state according to the specification of the power saving mode.

With this analogy, the wireless access point 110 may set the sleep permission map information SPM based on data stored in the buffer circuit, in order to assign the channel CH to the electronic devices 120[1]-120[5]. With the above arrangement, the electronic devices operating in the power saving mode may require more sleeping time, and the number of devices that receive the beacon frame BCN at the same time will be decreased. As a result, the contention of the electronic devices on the channel CH can be lower and the wake-up time of the electronic devices can be shortened, in order to decrease overall power consumption and keep a certain transmission performance.

FIG. 3A shows a flow chart of an uplink frame exchanging method 300 according to some embodiments of the present disclosure. In operation S310, the wireless access point transmits a packet having the sleep permission map information to the electronic devices that operate in the power saving mode. In examples of FIG. 3A, it is assumed that at least one of the electronic devices 120[1]-120[n] is prohibited from exchanging data. In operation S320, at least one first group of electronic devices in the electronic devices is prohibited from exchanging data with the wireless access point during the predetermined interval according to the sleep permission map information. In operation S330, at least one second group of electronic devices in the electronic devices is not prohibited from exchanging data with the wireless access point during the predetermined interval according to the sleep permission map information.

Figure 3B:
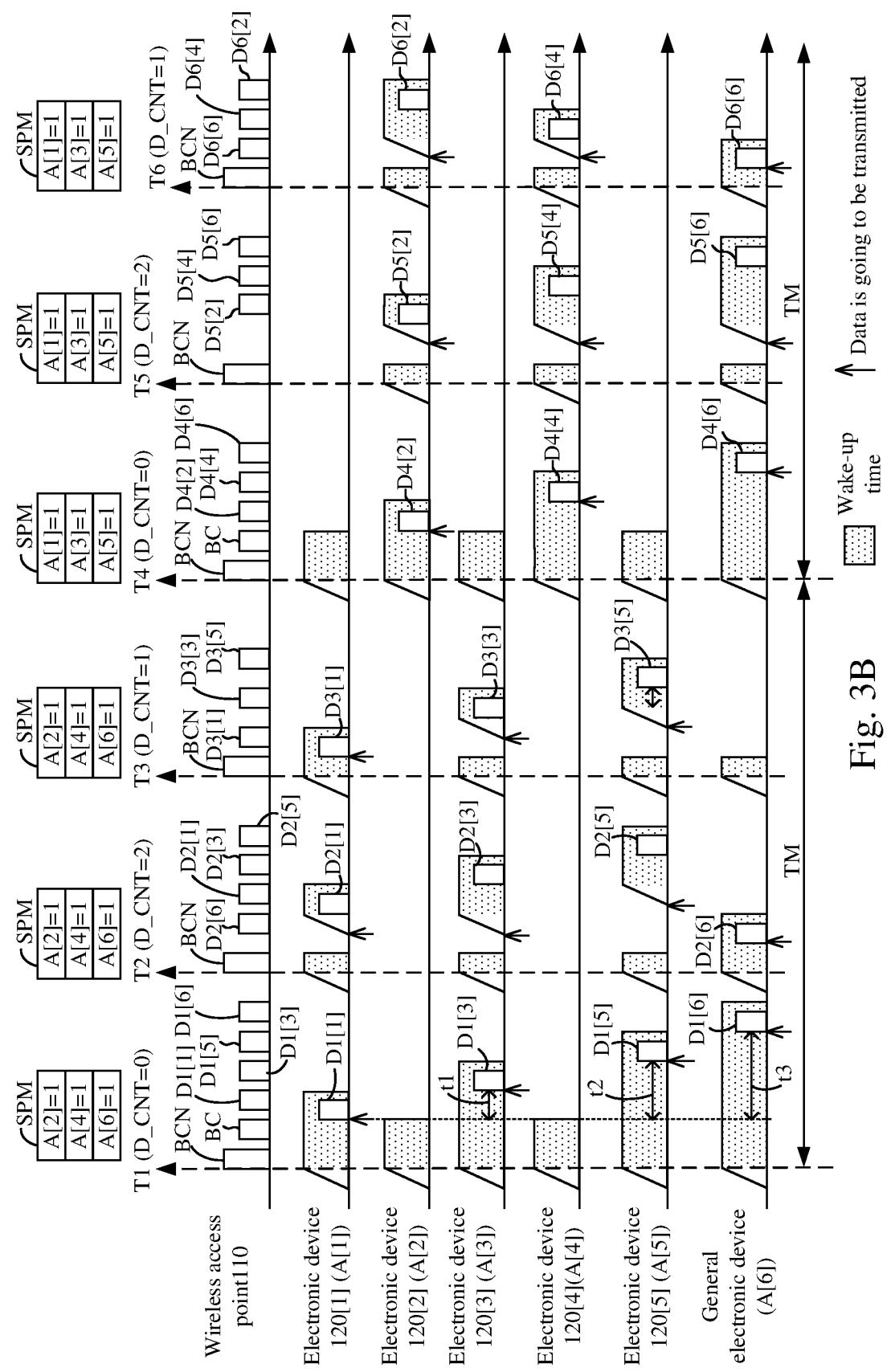
FIG. 3B shows a timing diagram illustrating the wireless communication system in FIG. 1 exchanging uplink frame according to some embodiments of the present disclosure.

In order to illustrate operations in FIG. 3A, reference is made to FIG. 3B, and FIG. 3B shows a timing diagram illustrating the wireless communication system 100 in FIG. 1 exchanging uplink frame according to some embodiments of the present disclosure. Similar to FIG. 2B, in this example, the DTIM period is 3 (i.e., the wireless access point 110 transmits the broadcast frame BC every 3 beacon interval) and the predetermined interval TM is set to be the same as the DTIM period, but the present disclosure is not limited thereto. In this example, before time T1, the electronic devices 120[1]-120[5] and the general electronic device operate in the power saving mode, and it is assumed that at least one of the electronic devices 120[1]-120[n] is prohibited from exchanging data.

In some embodiments, the wireless access point 110 may set the sleep permission map information SPM to control the electronic devices 120[1]-120[5] to transmit data group by group. For example, during the previous three periods, the wireless access point 110 sets the AIDs A[2], A[4], and A[6] in the sleep permission map information SPM to be the logic values of 1, in order to prohibit the electronic devices 120[2] and 120[4] and the general electronic device from exchanging data (i.e., operation S310). During the last three periods, the wireless access point 110 sets AIDs A[1], A[3], and A[5] in the sleep permission map information SPM to be the logic values of 1, in order to prohibit the electronic devices 120[1]. 120[3], and 120[5] from exchanging data (i.e., operation S310). In other words, the wireless access point 110 may divide the electronic devices 120[1]-120[5] and the general electronic device into groups according to the sleep permission map information SPM. A first group of electronic devices (i.e., the electronic devices 120[1], 120[3], and 120[5]) may transmit data to the wireless access point 110 during the previous three periods. A second group of electronic devices (i.e., the electronic devices 120[2] and 120[4]) may transmit data to the wireless access point 110 during the last three periods. As the general electronic device cannot identify the sleep permission map information SPM, and thus the general electronic device is able to transmit data during every period.

In greater detail, at time T1, all electronic devices 120 [1]-120[5] and the general electronic device are awakened, in order to receive the beacon frame BCN (which carries the sleep permission map information SPM) and the broadcast frame BC from the wireless access point 110. In response to the AIDs A[2] and A[4] in the sleep permission map information SPM, the electronic devices 120[2] and 120[4] are prohibited from exchanging data during the predetermined interval TM until the predetermined interval TM is expired (e.g., time T4 when the next DTIM count D_CNT has the predetermined value (e.g., 0)) (i.e., operation S320).

During the first period, as the electronic devices 120[1], 120[3], and 120[5] and the general electronic device are not prohibited from exchanging data and all have data to be transmitted to the wireless access point 110, the electronic devices 120[1], 120[3], and 120[5] and the general electronic device may transmit data to the wireless access point 110 via the channel CH during the predetermined interval TM (i.e., operation S330). For example, during the first period, the electronic devices 120[1], 120[3], and 120[5] and the general electronic device may respectively transmit the data D1[1], D1[3], D1[5], and D1[6] to the wireless access point 110 sequentially via the channel CH. If the electronic devices 120[1], 120[3], and 120[5] and the general electronic device have no data to be transmitted to the wireless access point 110, those electronic devices may enter the sleeping state according to the specification of the power saving mode until time T2.

At time T2, the electronic devices 120[1], 120[3], and 120[5] and the general electronic device are awakened, in order to receive the beacon frame BCN that carries the sleep permission map information SPM from the wireless access point 110. During the second period, the electronic devices 120[2] and 120[4] are continuously prohibited from transmitting data to the wireless access point 110 (i.e., operation S320).

As the sleep permission map information SPM is unchanged, the electronic devices 120[1], 120[3], and 120 [5] and the general electronic device may transmit data to the wireless access point 110 during the second period (i.e., operation S330). During the second period, the general electronic device and the electronic devices 120[1], 120[3], and 120[5] may respectively transmit data D2[6], D2[1], D2[3], and D2[5] to the wireless access point 110 sequentially via the channel CH.

Similarly, at time T3, the electronic devices 120[1], 120[3], and 120[5] and the general electronic device are awakened, in order to receive the beacon frame BCN that carries the sleep permission map information SPM from the wireless access point 110. During the third period, the electronic devices 120[2] and 120[4] are continuously prohibited from transmitting data to the wireless access point 110 (i.e., operation S320). As the sleep permission map information SPM is unchanged, the electronic devices 120 [1], 120[3], and 120[5] and the general electronic device may transmit data to the wireless access point 110 during the third period (i.e., operation S330). During the third period, the general electronic device has no data to be transmitted to the wireless access point 110 and may enter the sleep state according to the specification of the power saving mode, and the electronic devices 120[1], 120[3], and 120[5] may respectively transmit data D3[1], D3[2] and D3[5] to the wireless access point 110 sequentially via the channel CH.

At time T4, as the previous predetermined interval TM is end, the electronic devices 120[2] and 120[4] are not prohibited from exchanging data. Moreover, as the DTIM count D_CNT corresponding to time T4 has the predetermined value (e.g., 0), the wireless access point 110 transmits the beacon frame BCN (which carries the sleep permission map information SPM) and the broadcast frame BC. Under this condition, all the electronic devices 120[1]-120[5] and the general electronic device are awakened, in order to receive the beacon frame BCN and the broadcast frame BC from the wireless access point 110.

In response to the AIDs A[1], A[3], and A[5] in the sleep permission map information SPM, the electronic devices 120[1], 120[3], and 120[5] are prohibited from transmitting data to the wireless access point 110 during the predetermined interval TM until the predetermined interval TM is expired (e.g., the time when the next DTIM count D_CNT has the predetermined value (e.g., 0)) (i.e., operation S320).

During an interval between time T4 and time T5 (hereinafter referred to as a fourth period which corresponds to the DTIM count D_CNT having a value of 0), as the electronic devices 120[2] and 120[4] and the general electronic device all have data to be transmitted to the wireless access point 110, and thus the electronic devices 120[2] and 120[4] and the general electronic device may transmit data to the wireless access point 110 via the channel CH during the predetermined interval TM (i.e., operation S330). For example, during the fourth period, the electronic devices 120[2] and 120[4] and the general electronic device may respectively transmit data D4[2], D4[4], and D4[6] to the wireless access point 110 sequentially via the channel CH.

At time T5, the electronic devices 120[2] and 120[4] and the general electronic device are awakened, in order to receive the beacon frame BCN that carries the sleep permission map information SPM from the wireless access point 110. During an interval between time T5 and time T6 (hereinafter referred to as a fifth period, which corresponds to the DTIM count having a value of 2), the electronic devices 120[1], 120[3], and 120[5] are continuously prohibited from exchanging data with the wireless access point 110 (i.e., operation S320).

As the sleep permission map information SPM is unchanged, the electronic devices 120[2] and 120[4] and the general electronic device may transmit data to the wireless access point 110 during the fifth period (i.e., operation S330). For example, during the fifth period, the electronic devices 120[2] and 120[4] and the general electronic device may respectively transmit D5[2], D5[4], and D5[6] to the wireless access point 110 sequentially via the channel CH.

At time T6, the electronic devices 120[2] and 120[4] and the general electronic device are awakened, in order to receive the beacon frame BCN that carries the sleep permission map information SPM from the wireless access point 110. During a DTIM period starting from time T6 (hereinafter referred to as a sixth period, which corresponds to the DTIM count D_CNT having a value of 1), the electronic devices 120[1], 120[3], and 120[5] continuously stop transmitting data to the wireless access point 110 (i.e., operation S320).

As the sleep permission map information SPM is unchanged, the electronic devices 120[2] and 120[4] and the general electronic device may transmit data to the wireless access point 110 during the sixth period (i.e., operation S330). For example, during the sixth period, the general electronic device, the electronic device 120[4] and the electronic device 120[2] may respectively transmit data D6[6], D6[4], and D6[2] to the wireless access point 110 sequentially via the channel CH.

With this analogy, the wireless access point 110 may set the sleep permission map information SPM to control the electronic devices 120[1]-120[5] to transmit data to the wireless access point 110 via the channel CH group by group. It can be understood that, based on FIG. 3B, during the same interval, if a number of the electronic devices going to transmit data is higher, the contention time on the channel CH is longer. Taking the first period as an example, each electronic device starts transmitting data to the wireless access point 110 via the channel CH after the data transmission of the previous electronic device is completed. A contention time t1 exists between a time for the electronic device 120[1] starting to transmit data D1[1] and a time for the electronic device 120[3] starting to transmit data D1[3]. A contention time t2 exists between a time for the electronic device 120[1] starting to transmit data D1[1] and a time for the electronic device 120[5] starting to transmit data D1[5]. A contention time t3 exists between the time for the electronic device 120[1] starting to transmit the data D1[1] and a time for the general electronic device starting to transmit the data D1[6], in which the contention time t3 is longer than the contention time t2, and the contention time t2 is longer than the contention time t1.

Generally, as shown in FIG. 3B, if the contention time is longer, the wake-up time for the corresponding electronic device is longer. With the above grouping mechanism, it is able to reduce the number of the electronic devices able to transmit data to the wireless access point 110 during the same period. As a result, it is able to reduce the contention time and the wake-up time, in order to reduce the power consumption. Moreover, the electronic devices that operate in the power saving mode may acquire longer sleeping time, and the number of electronic devices that receive the beacon frame BCN at the same time can be reduced, and thus the overall power consumption can be further reduced.

The above configurations about the predetermined interval TM and the sleep permission map information SPM and the number of electronic devices are given for illustrative purposes, and the present disclosure is not limited thereto. Various proper configurations about the predetermined interval TM and the sleep permission map information SPM and various numbers of electronic devices are within the contemplated scope of the present disclosure.

In some embodiments, the power saving mode implemented with the sleep permission map information SPM may be compatible with an existing power saving mechanism, which may be WMM power save (WMM-PS) mode, Peer-to-Peer (P2P) mode, and/or target wake time (TWT) mode. For example, if the wireless communication system 100 operates in P2P mode, the wireless access point 110 may operate as a group owner under the P2P mode, the electronic devices 120[1]-120[n] may operate as group clients under the P2P mode. Under this condition, the wireless access point 110 may announce a notice of absence (NOA) interval, and the electronic devices 120[1]-120[n] stop exchanging data during the NOA interval. During a non-NOA interval, the electronic devices 120[1]-120[n] may acquire additional sleeping time or may be grouping grouped according to the sleep permission map information SPM, in order to reduce power consumption under the P2P mode. Alternatively, if the electronic device 120[1] operates in the TWT mode, the electronic device 120[1] may be awakened at a target wake up time to receive the beacon frame BCN and a trigger frame, and the time for the electronic device 120[1] exchanging data with the wireless access point 110 is not overlapped with the time for the electronic devices 120[2]-120[n] exchanging data with the wireless access point 110.

Figure 4:
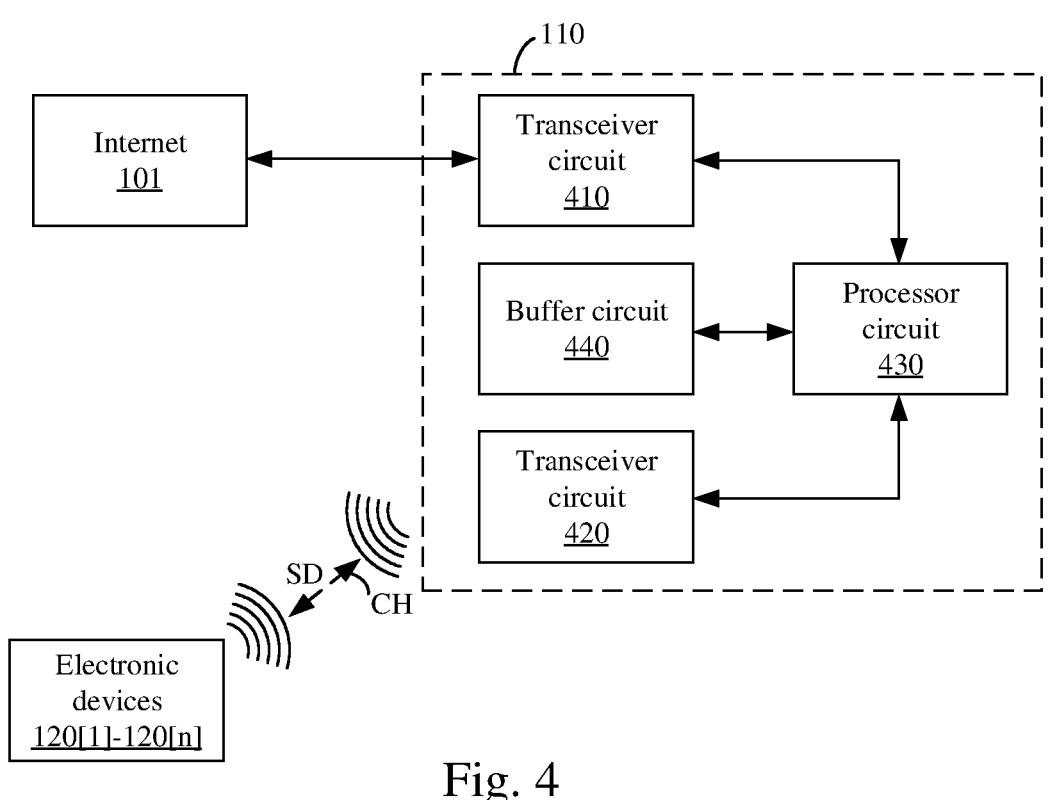
FIG. 4 shows a schematic diagram of the wireless access point in FIG. 1 according to some embodiments of the present disclosure.

FIG. 4 shows a schematic diagram of the wireless access point 110 in FIG. 1 according to some embodiments of the present disclosure. The wireless access point 110 includes a transceiver circuit 410, a transceiver circuit 420, a processor circuit 430, and a buffer circuit 440. The transceiver circuit 410 is configured to be connected with the internet Internet 101. The transceiver circuit 420 is configured to be connected with the electronic devices 120[1]-120[n] in FIG. 1 via the channel CH.

The processor circuit 430 is coupled to the transceiver circuit 410, the transceiver circuit 420, and the buffer circuit 440. The processor circuit may transmit and receive data via the transceiver circuit 410 and the transceiver circuit 420. The processor circuit 430 may further transmit the packet SD to the electronic devices 120[1]-120[n] via the transceiver circuit 420, in order to control the electronic devices 120[1]-120[n] to determine whether to be prohibited from exchanging data with the transceiver circuit 420 during the predetermined interval TM. For example, the processor circuit 430 may execute one or more program codes, in order to perform operation S210 in FIG. 2A. Alternatively, the processor circuit 430 may execute one or more program codes to perform operation S310 in FIG. 3A. The buffer circuit 440 is configured to store data to be transmitted (as shown in FIG. 2B) or store data transmitted from the electronic devices 120[1]-120[n] (as shown in FIG. 3B).

Figure 5:
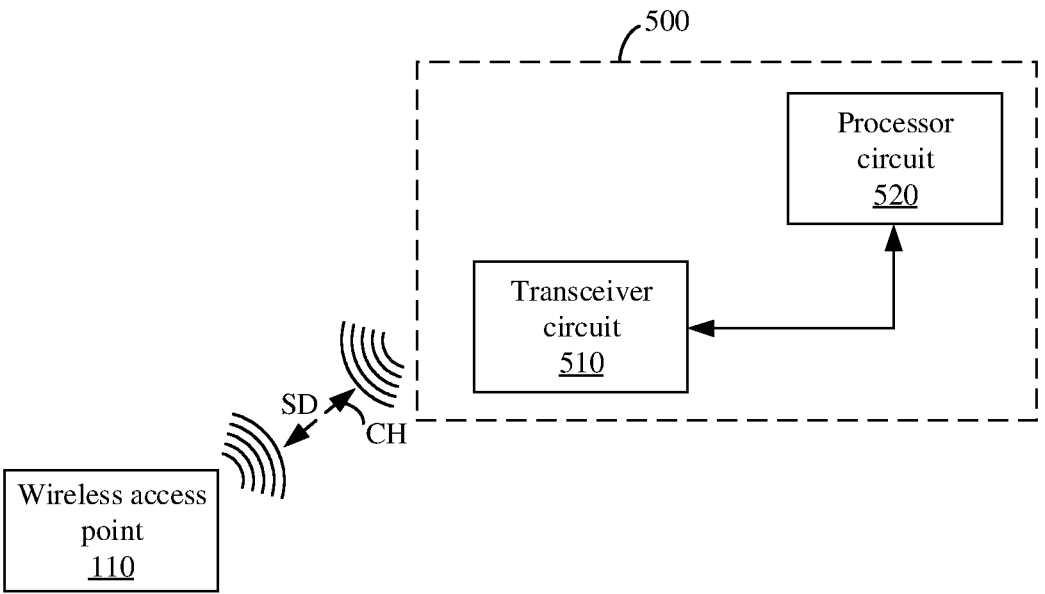
FIG. 5 shows a schematic diagram of an electronic device according to some embodiments of the present disclosure.

FIG. 5 shows a schematic diagram of an electronic device 500 according to some embodiments of the present disclosure. The electronic device 500 may be employed to implement any one of the electronic devices 120[1]-120[n] in FIG. 1.

The electronic device 500 includes transceiver circuit 510 and a processor circuit 520. The transceiver circuit 510 is configured to be connected with the wireless access point 110 via the channel CH. The processor circuit 520 is configured to prohibit the transceiver circuit 510 from exchanging data with the wireless access point 110 during the predetermined interval TM according to the sleep permission map information, in which the transceiver circuit 510 operates in the power saving mode during the predetermined interval TM. For example, the processor circuit 520 may execute one or more program codes, in order to perform operation S220 and operation S230 in FIG. 2A. Alternatively, the processor circuit 520 may execute one or more program codes to perform operation S320 and operation S330 in FIG. 3A.

As described above, the wireless communication system, the wireless access point, and the electronic device in some embodiments of the present disclosure may utilize the sleep permission map information to selectively control electronic device(s) operating in the power saving mode to stop exchanging data, in order to reduce the number of electronic devices exchanging data with the wireless access point during the same interval and reduce the contention on the channel. As a result, the overall transmission performance can be improved, and the overall power consumption can be reduced.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The aforementioned descriptions represent merely the preferred embodiments of the present disclosure, without any intention to limit the scope of the present disclosure thereto. Various equivalent changes, alterations, or modifications based on the claims of the present disclosure are all consequently viewed as being embraced by the scope of the present disclosure.

What is claimed is:

1. A communication system, comprising:

a wireless access point configured to transmit a packet having sleep permission map information and traffic indication map information; and a plurality of electronic devices configured to be connected with the wireless access point via a channel and receive the packet and operate in a power saving mode, wherein each of the plurality of electronic devices is configured to be selectively prohibited from exchanging data with the wireless access point via the channel during a predetermined interval according to the sleep permission map information, wherein the predetermined interval corresponds to a plurality of beacon intervals, and in response to the sleep permission map information indicating that a corresponding electronic device of the plurality of electronic devices is prohibited from exchanging the data with the wireless access point, the corresponding electronic device is prohibited from exchanging the data with the wireless access point until the predetermined interval expires, regardless of whether the traffic indication map information indicates that the data is expected to be acquired from the wireless access point by the corresponding electronic device.

2. The communication system of claim 1, wherein each of the plurality of electronic devices is configured to determine whether to be prohibited from exchanging the data during the predetermined interval according to a corresponding one of a plurality of association identifiers in the sleep permission map information.

3. The communication system of claim 1, wherein if the wireless access point stores first data to be transmitted to a first electronic device in the plurality of electronic devices, the wireless access point is further configured to set the sleep permission map information according to the first data, in order to transmit the first data to the first electronic device via the channel during the predetermined interval.

4. The communication system of claim 1, wherein if a first electronic device in the plurality of electronic devices operates in the power saving mode and is not prohibited from exchanging the data with the wireless access point during a previous period, the first electronic device is configured to determine whether to be prohibited from exchanging the data during the predetermined interval according to the sleep permission map information.

5. The communication system of claim 1, wherein if a first electronic device in the plurality of electronic devices operates in the power saving mode and is prohibited from exchanging the data with the wireless access point during a previous period, the first electronic device is continuously prohibited from exchanging the data with the wireless access point according to the sleep permission map information.

6. The communication system of claim 1, wherein a first electronic device in the plurality of electronic devices operates in the power saving mode and is prohibited from exchanging the data with the wireless access point according to the sleep permission map information until the predetermined interval is expired.

7. The communication system of claim 1, wherein the wireless access point is further configured to set the sleep permission map information, in order to control the plurality of electronic devices to transmit data group by group.

8. The communication system of claim 1, wherein the wireless access point is further configured to set the predetermined interval based on a delivery traffic indication map count.

9. The communication system of claim 8, wherein the plurality of electronic devices are not prohibited from exchanging the data with the wireless access point when the delivery traffic indication map count has a predetermined value.

10. The communication system of claim 1, wherein the plurality of electronic devices comprise a first electronic device and a second electronic device, the first electronic device and the second electronic device respectively transmit first data and second data to the wireless access point during the predetermined interval according to the sleep permission map information, and the second electronic device starts transmitting the second data after the transmission of the first data is completed.

11. A wireless access point, comprising:

a first transceiver circuit configured to be connected with Internet;

a second transceiver circuit configured to be connected with a plurality of electronic devices via a channel, wherein the plurality of electronic devices operate in a power saving mode; and a processor circuit configured to transmit a packet having sleep permission map information and traffic indication map information to the plurality of electronic devices via the second transceiver circuit, in order to control the plurality of electronic devices to determine whether to be prohibited from exchanging data with the second transceiver circuit during a predetermined interval according to the sleep permission map information, wherein the predetermined interval corresponds to a plurality of beacon intervals, and in response to the sleep permission map information indicating that a corresponding electronic device of the plurality of electronic devices is prohibited from exchanging the data with the second transceiver circuit, the corresponding electronic device is prohibited from exchanging the data with second transceiver circuit until the predetermined interval expires, regardless of whether the traffic indication map information indicates that the data is expected to be acquired from the second transceiver circuit by the corresponding electronic device, and the.

12. The wireless access point of claim 11, wherein the sleep permission map information comprises a plurality of association identifiers respectively corresponding to the plurality of electronic devices.

13. The wireless access point of claim 11, further comprising:

a buffer circuit configured to store data to be transmitted to the plurality of electronic devices, wherein if the buffer circuit stores first data to be transmitted to a first electronic device in the plurality of electronic devices, the processor circuit is further configured to set the sleep permission map information according to the first data, in order to transmit the first data to the first electronic device via the channel during the predetermined interval.

14. The wireless access point of claim 11, wherein the processor circuit is further configured to set the sleep permission map information, in order to control the plurality of electronic devices to transmit data group by group.

15. The wireless access point of claim 11, wherein the packet is transmitted to the plurality of electronic devices simultaneously.

16. An electronic device, comprising:
a transceiver circuit configured to be connected with a wireless access point via a channel, in order to receive a packet comprising sleep permission map information and traffic indication map information; and
a processor circuit configured to selectively prohibit the transceiver circuit from exchanging data with the wireless access point during a predetermined interval according to the sleep permission map information,
wherein a plurality of devices are connected with the wireless access point and comprise the electronic device, the transceiver circuit operates in a power saving mode during the predetermined interval, wherein the predetermined interval corresponds to a plurality of beacon intervals, and in response to the sleep permission map information indicating that the transceiver circuit is prohibited from exchanging the data with the wireless access point, the transceiver circuit is prohibited from exchanging the data with the wireless access point until the predetermined interval expires, regardless of whether the traffic indication map information indicates that the data is expected to be acquired from the wireless access point by the transceiver circuit.

17. The electronic device of claim 16, wherein the processor circuit is configured to determine whether to prohibit the transceiver circuit from exchanging the data with the wireless access point during the predetermined interval according to a corresponding one of a plurality of association identifiers in the sleep permission map information.

18. The electronic device of claim 16, wherein the processor circuit is configured to not prohibit the transceiver circuit from exchanging the data with the wireless access point when a delivery traffic indication map count has a predetermined value.

19. The electronic device of claim 16, wherein the processor circuit is configured to prohibit the transceiver circuit from exchanging the data with the wireless access point according to the sleep permission map information until the predetermined interval is expired.

* * * * *